United States Patent [19]
Collins

[11] Patent Number: 5,880,739
[45] Date of Patent: *Mar. 9, 1999

[54] BLITTING OF IMAGES USING INSTRUCTIONS

[75] Inventor: Roger S. Collins, Novato, Calif.

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 858,291

[22] Filed: May 19, 1997

Related U.S. Application Data

[63] Continuation of Ser. No. 479,138, Jun. 6, 1995, abandoned.
[51] Int. Cl.⁶ .................................................. G06T 13/00
[52] U.S. Cl. ........................ 345/433; 345/435; 345/473
[58] Field of Search .................................. 345/302, 429,
345/433, 435, 440, 473, 474, 113, 114,
121, 123, 202, 523, 524, 525

[56] References Cited

U.S. PATENT DOCUMENTS

| | | | |
|---|---|---|---|
| 5,025,249 | 6/1991 | Seiler et al. ................................ | 345/119 |
| 5,103,499 | 4/1992 | Miner et al. .............................. | 395/162 |
| 5,254,984 | 10/1993 | Wakeland ................................. | 345/144 |
| 5,355,175 | 10/1994 | Okada et al. ............................ | 348/595 |
| 5,388,841 | 2/1995 | San et al. ................................... | 463/44 |
| 5,394,523 | 2/1995 | Harris ........................................ | 395/162 |
| 5,448,688 | 9/1995 | Hemingway ............................. | 395/141 |
| 5,487,145 | 1/1996 | Marsh et al. ............................. | 395/162 |
| 5,513,307 | 4/1996 | Naka et al. .............................. | 345/474 |
| 5,519,826 | 5/1996 | Harper et al. ............................ | 395/152 |
| 5,546,518 | 8/1996 | Blossom et al. ......................... | 395/151 |
| 5,596,693 | 1/1997 | Needle et al. ........................... | 345/474 |

*Primary Examiner*—Stephen S. Hong
*Attorney, Agent, or Firm*—Pravel, Hewitt & Kimball

[57] ABSTRACT

An image is stored as data representing the values of non-transparent pixels, and stored instructions corresponding to some pixels, resulting in a data structure. The image may be displayed by executing two types of instructions. A first type of instruction includes a command to skip pixels in a destination image. A second type of instruction comprises a command to copy pixels from the source data to the destination image.

11 Claims, 11 Drawing Sheets

Microfiche Appendix Included
(2 Microfiche, 37 Pages)

BLITTING OF IMAGES USING INSTRUCTIONS

This is a continuation of application Ser. No. 08/479,138, filed Jun. 6, 1995, now abandoned.

REFERENCE TO MICROFICHE APPENDIX

An implementation of the invention is found in a microfiche appendix, containing 2 microfiche and 37 frames.

BACKGROUND

This invention relates to blitting.

Multimedia programs and games often display animation on a computer screen using "sprites". Sprites are "blitted" (short for "block transferred") onto a background scene in a rapid sequence to create the illusion of motion. Blitting must be performed many times per second to create smooth animation. On occasion, many animation sequences are run simultaneously, which increases the computational load on the computer.

A first common method of performing blitting is to examine each pixel in the stored sprite and determine whether the pixel has the code for a transparent color. If not, the pixel is opaque, and is copied onto the background.

A second common approach is to create and save a sprite with white pixels in place of the transparent pixels along with a "mask" bitmap. The mask contains white pixels in place of transparent pixels, and black pixels in place of opaque pixels. When the sprite is to be displayed, the mask is ANDed with the background to create a resulting image with black pixels where the sprite will be located. This resulting image is then ORed with the sprite, to insert the sprite at the black pixels.

In addition to the above methods used in general purpose computers, some special purpose game machines, such as Sega® and Nintendo®, contain hardware to perform blitting very quickly.

SUMMARY

In general, in one aspect, the invention features a method of storing an image (e.g. a sprite) having of transparent and non-transparent pixels. Data representing the values of the non-transparent pixels is stored, and each of at least some pixels are mapped to corresponding stored instructions.

Implementations of the invention may include the following features. Transparent pixels may be mapped to a first type of instruction, e.g. a command to skip pixels. Non-transparent pixels may be mapped to a second type of instruction, e.g. a command to copy pixels from a source to a destination. Groups of adjacent pixels may be mapped to single instructions. An edge of the image may be mapped to a corresponding stored instruction. The instructions may be machine-executable. The image may be scanned, a number of adjacent similar pixels counted, and an instruction which varies depending upon the counted number added to a queue when the type of pixel changes or when a row of pixels ends.

In general, in another aspect, the invention features a data structure including the values of non-transparent pixels, and an instruction queue holding instructions mapped from at least some of said pixels.

In general, in another aspect, the invention features a method of displaying a stored image by executing two types of instructions. A first type of instruction comprises a command to skip transparent pixels. A second type of command comprises a command to copy non-transparent pixels from source data representing non-transparent pixels.

Implementations of the invention may include the following features. A destination pointer may be incremented in response to a skip command. Data may be copied from a source to a destination in response to a copy command. The source pointer and a destination pointer may be incremented in response to the copy command. The skip command may increment the destination pointer by the number transparent pixels in a contiguous group. The copy command may copy a number of pixels equal to a number of non-transparent pixels in a contiguous group.

The advantages of the invention include one or more of the following. More sprites may be stored in disk or memory. The sprites may be blitted to the computer screen of a general purpose computer extremely quickly, resulting in smoother animation. More animation sequences can be run simultaneously. Blitting may be performed without the use of jump (JMP) instructions.

Other features and advantages of the invention will become apparent from the following description and from the claims.

DESCRIPTION

Figure 1:
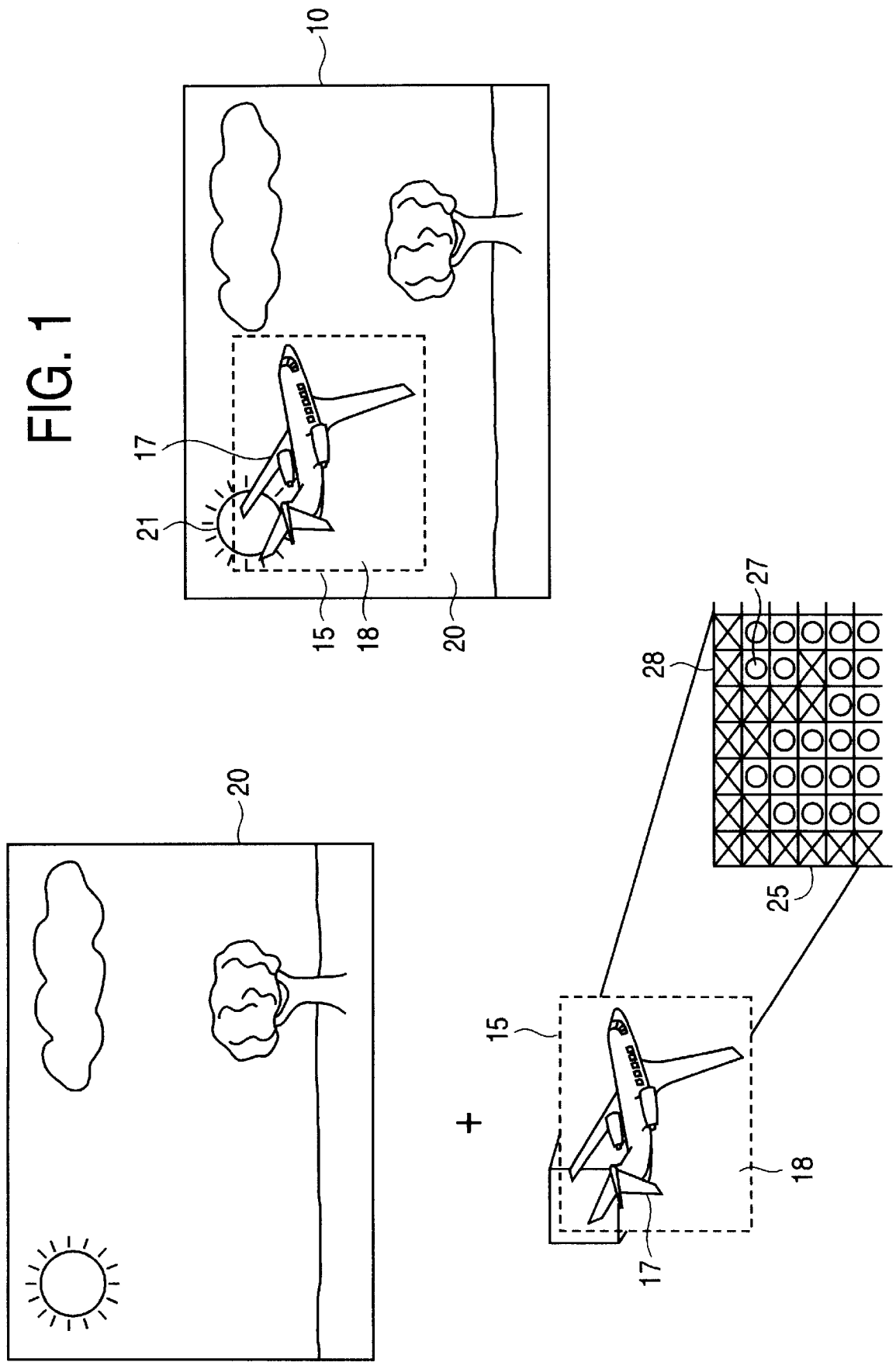
FIG. 1 is a schematic illustration of blitting.

As seen in FIG. 1, to create an image of an airplane 17 in a scene 10, a small rectangular image 15, sometimes called a "sprite", is blitted on a background scene 20. Sprite 15 includes a solid airplane 17 which obscures background 20. The remainder of sprite 15 is a transparent window 18 through which background 20 (e.g. sun 21) may be seen. Sprite 15 is typically represented by a pixelmap 25 having transparent pixels 28 (marked with an "X") corresponding to window 18, and opaque pixels 27 of any other color 27 (marked with an "O") corresponding to airplane 17. By rapidly and smoothly blitting sprite 15 (at a rate of at least fifteen frames per second) in a series of different locations in succeeding frames, airplane 17 will appear to move over background 20. Pixelmap 25 may be from a standard source, such as a Windows BMP file, and is usually a 256 color palletized image such as a color picture.

Figure 2:
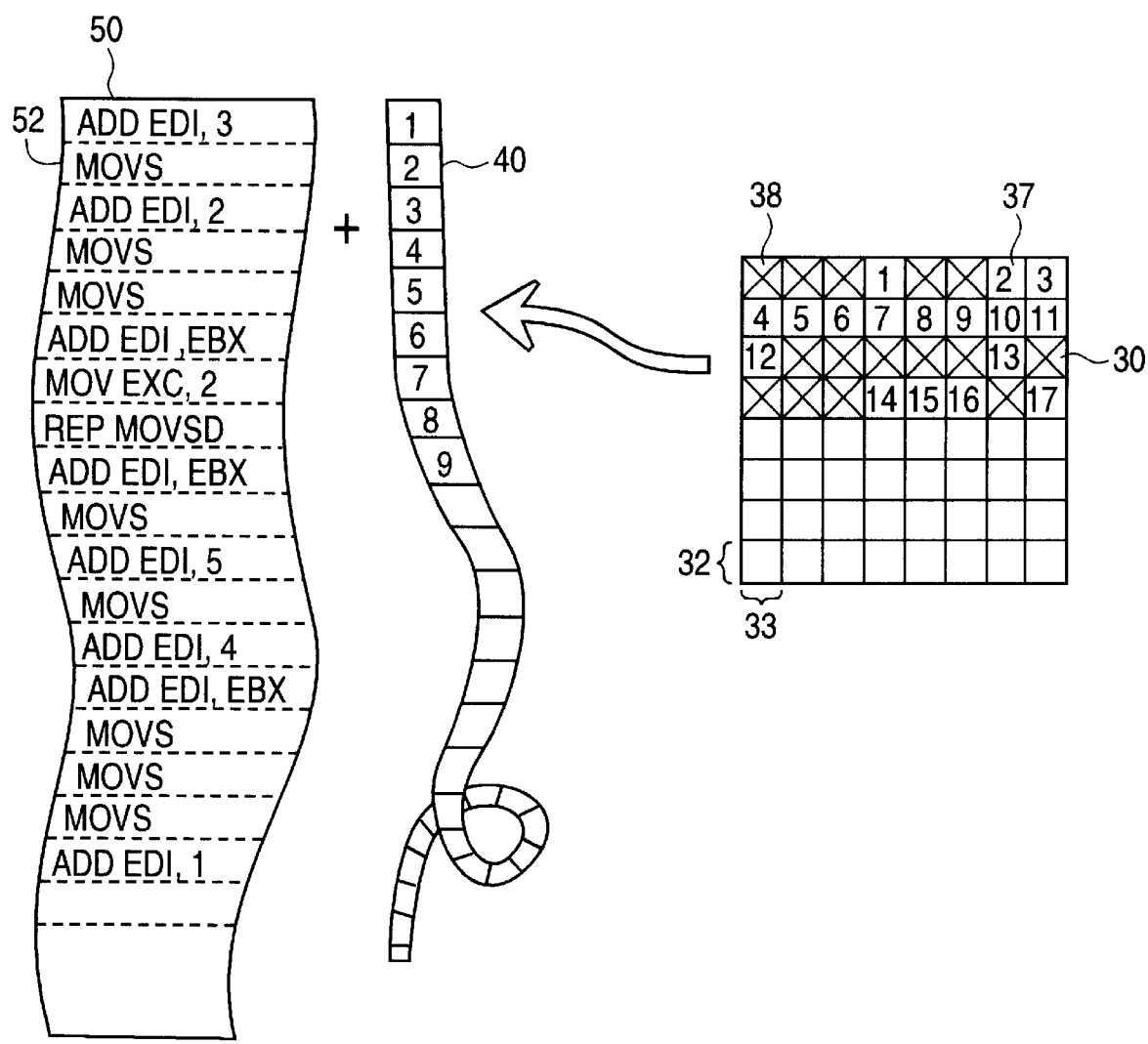
FIG. 2 is a representation of an instruction queue and a string.

As shown in FIG. 2, for the purposes of display, sample sprite 30 is converted into a string of pixel values 40 and an instruction queue 50. The pixelmap of sprite 30 is a pixelmap with eight rows 32 and eight columns 33. Assuming each pixel requires one byte, then sprite 30 occupies sixty-four bytes of memory. Sprite 30 includes transparent pixels 38, marked with an X, and opaque pixels 37, marked with numbers. Different opaque pixels 37 may be different colors (or tone in a greyscale display). In general, each color is represented by its own code. The numbers of the opaque pixels 37 and in string 40 are merely index numbers to aid in understanding the relationships between the Figures; they are not color codes. String 40 contains the color codes of the opaque pixels 37, in sequence and without codes for intervening transparent pixels 38. Instructions queue 50 includes individual machine-executable instructions 52 used to display sprite 30 on background 20.

Figure 3:
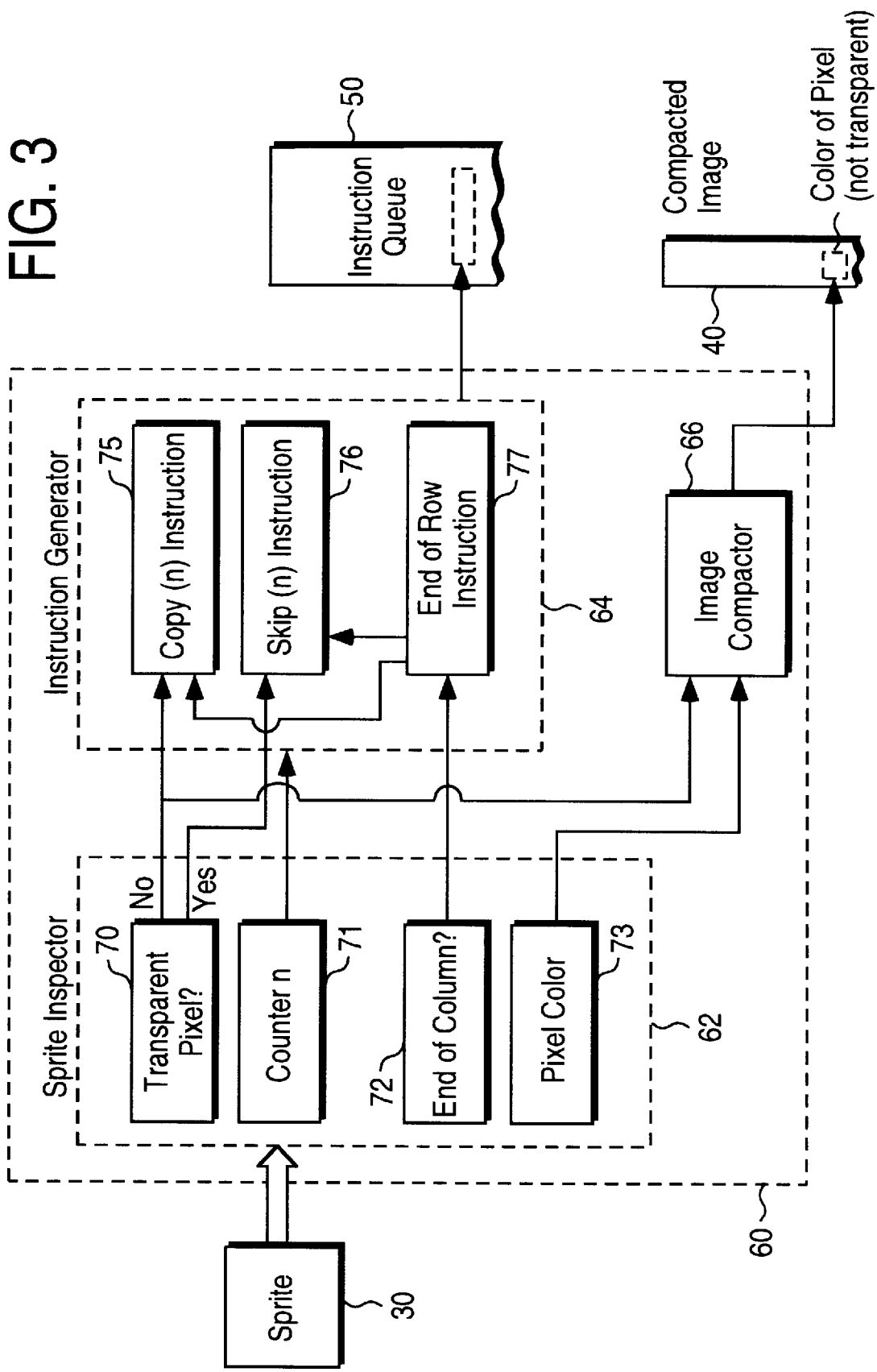
FIG. 3 is a schematic block diagram of a program to convert a sprite pixelmap into an instruction queue and a string.

Sprite pixelmap 30 is converted to string 40 and instruction queue 50 by a converter program 60 in FIG. 3. Converter program 60 includes three functional parts: a sprite inspector 62, an instruction generator 64, and an image compactor 66. Sprite inspector 62 scans pixelmap 30, pixel by pixel. Detector 70 determines the type of pixel (i.e., transparent or opaque). Counter 71 counts the number of adjacent pixels of similar type. Each time the type of pixel changes, counter 71 issues an instruction to generator 64 to add an instruction to the queue. If the pixels were opaque, copy subroutine 75 adds a copy instruction to queue 50. If the pixels were transparent, skip subroutine 76 adds a skip instruction to queue 50. The nature of the skip and copy instruction may depend on the output of counter 71. An end-of-row routine 72 senses the end of each row 32, and may cause subroutine 77 to issue end-of-row instructions. Subroutine 77 might call the copy and skip subroutines 75 and 76. For every opaque pixel, compactor 66 adds the pixel color to string 40.

Figure 4:
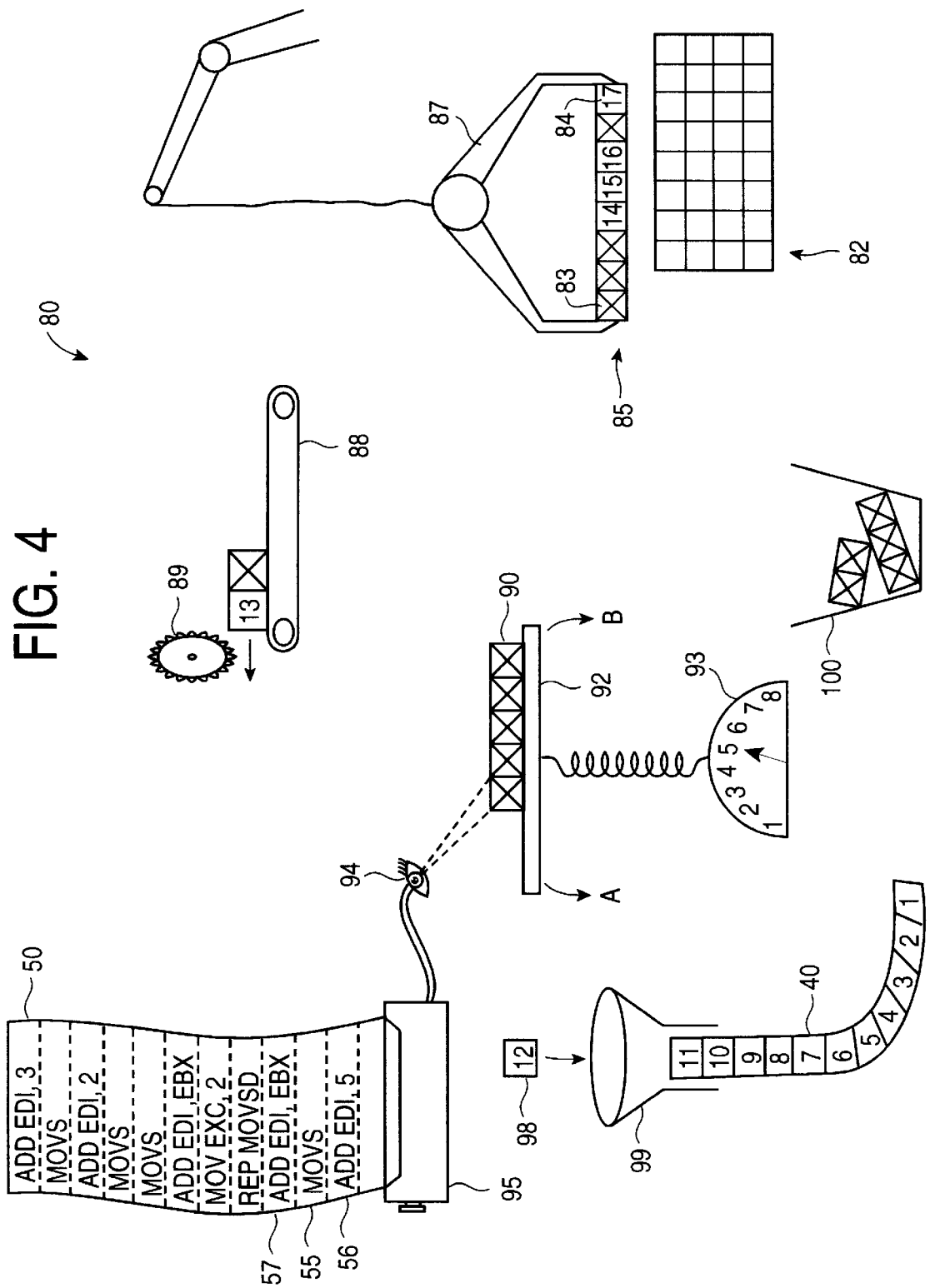
FIG. 4 is an metaphorical mechanical apparatus illustrating the process of FIGS. 5–9.

In order to explain program 60, an imaginary mechanical apparatus 80 which performs equivalent functions is shown in FIG. 4. Pixelmap 30 can be conceived as a rectangular slab 82 that has been divided into a grid. Some of the squares in the grid have been painted with different colors (such as square 84 marked with "17") and are opaque, while other squares in the grid are unpainted and transparent (such as square 83 marked with an "X"). A claw 87 lifts each row 85 of squares in turn, and deposits the row onto conveyor belt 88. Conveyor 88 carries the row underneath saw 89. Each time the squares change, from transparent to opaque, or vice-versa, saw 89 descends and separates a group of similar squares 90. The group of squares 90 falls onto a pan 92 attached to a scale 93. While an electronic eye 94 determines whether the squares are transparent or opaque, scale 93 measures the number of squares in the group.

If the squares are opaque, then printer 95 adds a copy command to the queue 50. Then pan 94 tilts in the direction of arrow A, and the blocks fall through a funnel 99 and are added to string 40. For example, when the single painted block 98 was scanned by eye 94, copy instruction 55 "MOVS" was added to queue 50.

If the blocks are transparent, then printer 95 adds a skip command to the queue 50. Then pan 92 tilts in the direction of arrow B, and the group is discarded in garbage can 100. For example, the group of five transparent squares on scale 92 was just scanned by eye 94, and skip instruction 56 "ADD EDI, 5" was just added to queue 50. Group 90 is about to be deposited in garbage can 100.

Once the entire row 85 has been processed, printer 95 adds an end of row command to queue 50. For example, before opaque block 98 was processed, the end of row instruction 57 "ADD EDI, EBX" was added to queue 50. The pixelmap 82 is analyzed row by row until nothing remains. Then the complete queue 50 and string 40 have been assembled.

Figure 5:
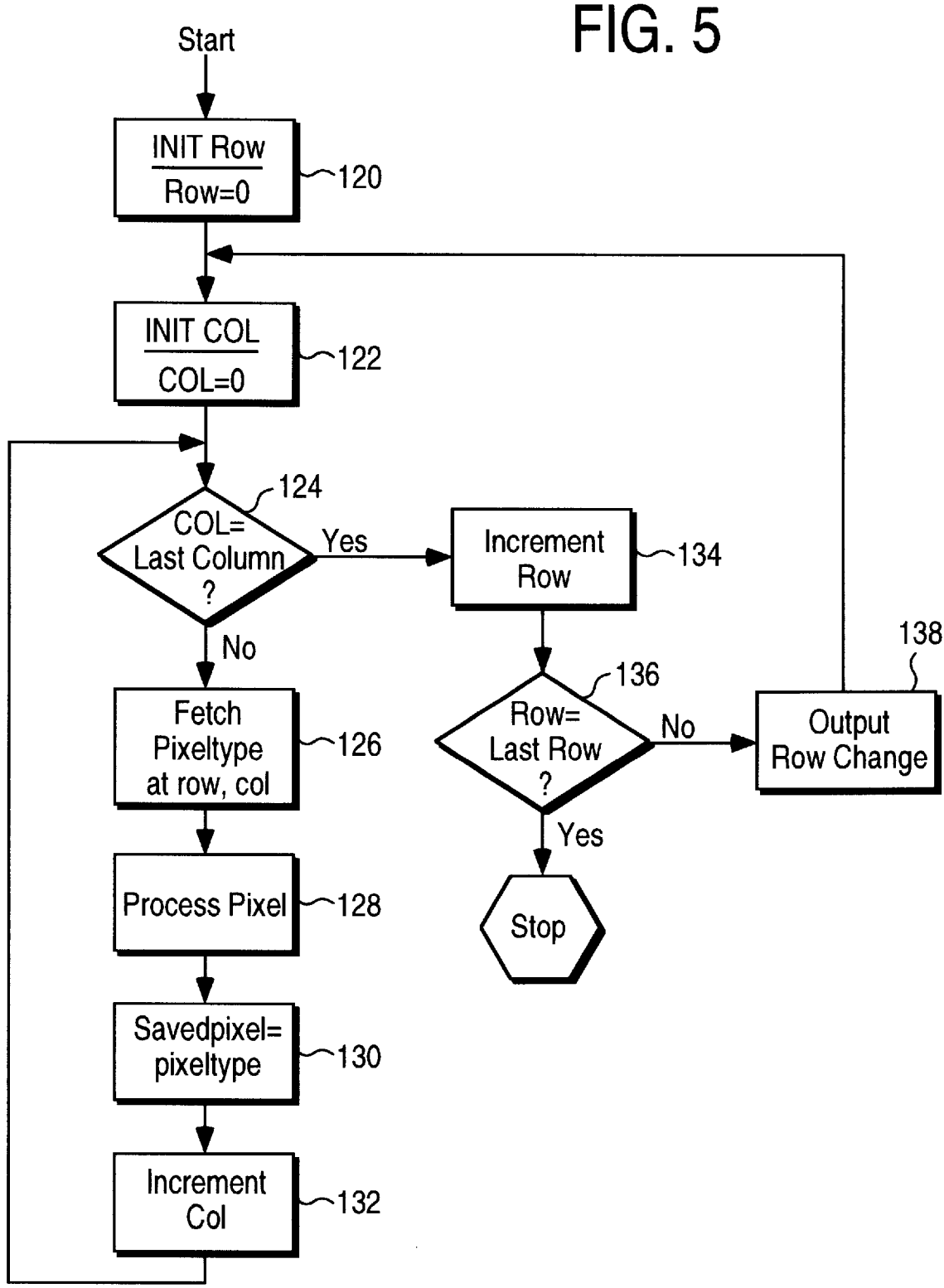
FIGS. 5–9 are flowcharts of a program to convert a sprite pixelmap into an instruction queue and a string.

In terms of a flowchart of controller 62 and instruction generator 64 as shown in FIG. 5, the program begins in steps 120 and 122 by initializing variables row and col to zero. The counters row and col indicate the coordinates of the pixel, and the variable pixel type indicates the type of pixel. The col counter is compared to a stored constant representing the width of pixelmap 30, lastcolumn, in step 124.

Assuming col is less than lastcolumn, then in step 126 pixeltype is determined for the pixel at row, col in pixelmap 30. The subroutine ProcessPixel is called in step 128. Once subroutine ProcessPixel is complete, in step 130 pixeltype is saved to the variable savedpixel. Then col is incremented in step 132, and the process returns to comparison step 124.

Eventually, col will be incremented to equal lastcolumn, and the program will branch to step 134 and increment row. After incrementing row, in step 136 row is compared to the constant representing the height of pixelmap 30, lastrow. Assuming that row is less than lastrow, then the subroutine RowChange is run in step 138, and the program then returns to step 122 to reinitialize col at zero. Once row is incremented to equal lastrow, the entire pixelmap 30 has been converted an instruction queue 50, and program 60 stops.

Figure 6:
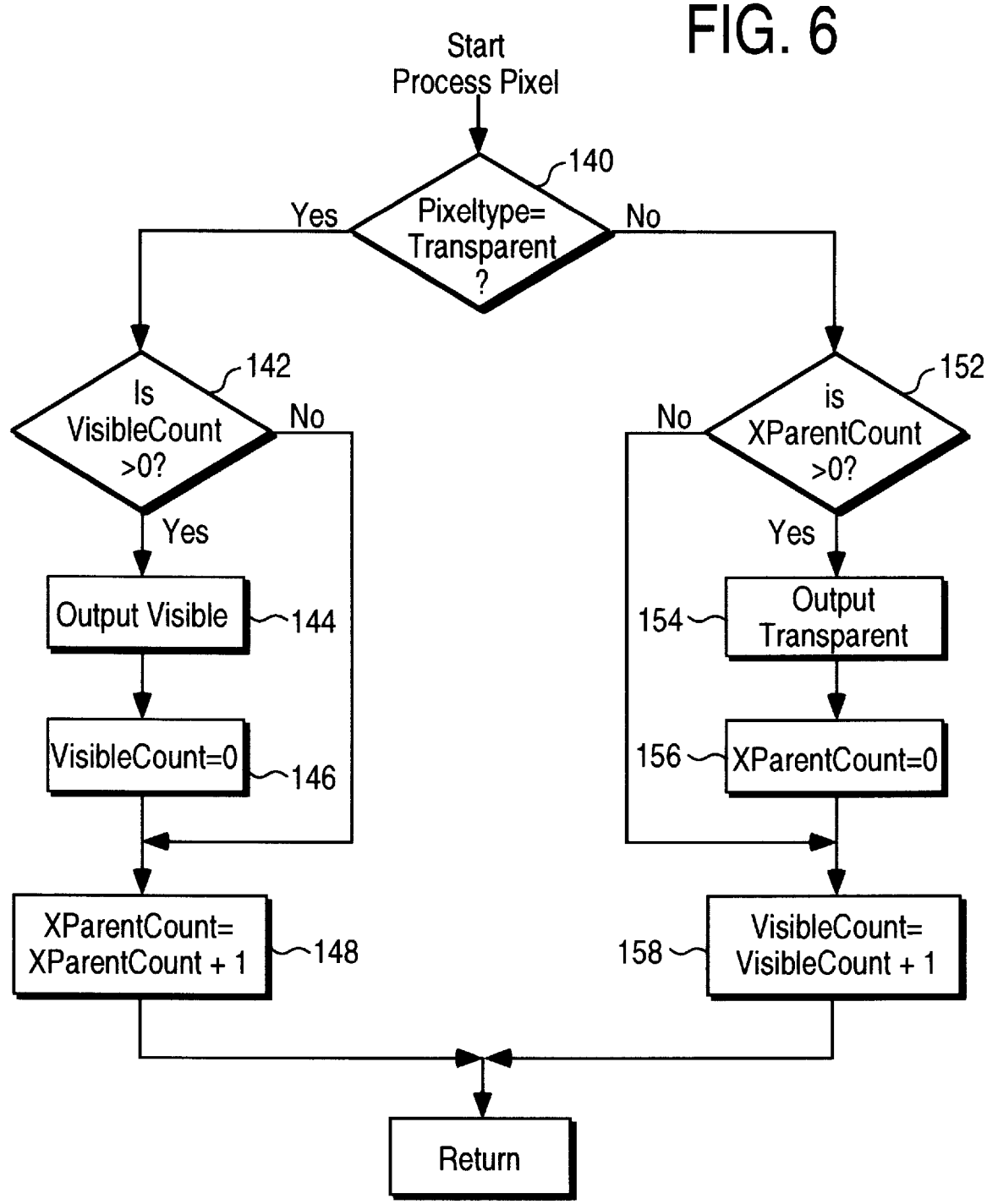

A mid-level flowchart of the ProcessPixel subroutine 128 is shown in FIG. 6. First, the subroutine determines in step 140 whether the pixel is transparent. In step 142, assuming that the pixel is transparent, a counter visiblecount is compared to zero. If visiblecount is greater than zero, then previous pixels were opaque, and the type of pixel has just changed. Therefore, a copy command is added to the queue by running the OutputVisible subroutine in step 144, and visiblecount is reset to zero in step 146. On the other hand, if visiblecount equals zero, then the previous pixels have been transparent, the type of pixel hasn't changed, and steps 144 and 146 are skipped. In either case, since a transparent pixel has just been detected, xparentcount is incremented by one in step 148. Finally, the ProcessPixel subroutine returns to the program that called it.

If the pixel is non-transparent, a symmetric set of steps is carried out. First, xparentcount is compared to zero in step 152. If xparentcount is greater than zero, then previous pixels were transparent, and the type of pixel has just changed. Therefore, a skip command is added to the queue by running the OutputTransparent subroutine in step 154, and xparentcount is reset to zero in step 156. On the other hand, if xparentcount equals zero, then the previous pixels have been opaque, and the type of pixel hasn't changed, and steps 154 and 156 are bypassed. In either case, since a opaque pixel has just been detected, visiblecount is incremented by one in step 158.

Figure 7:
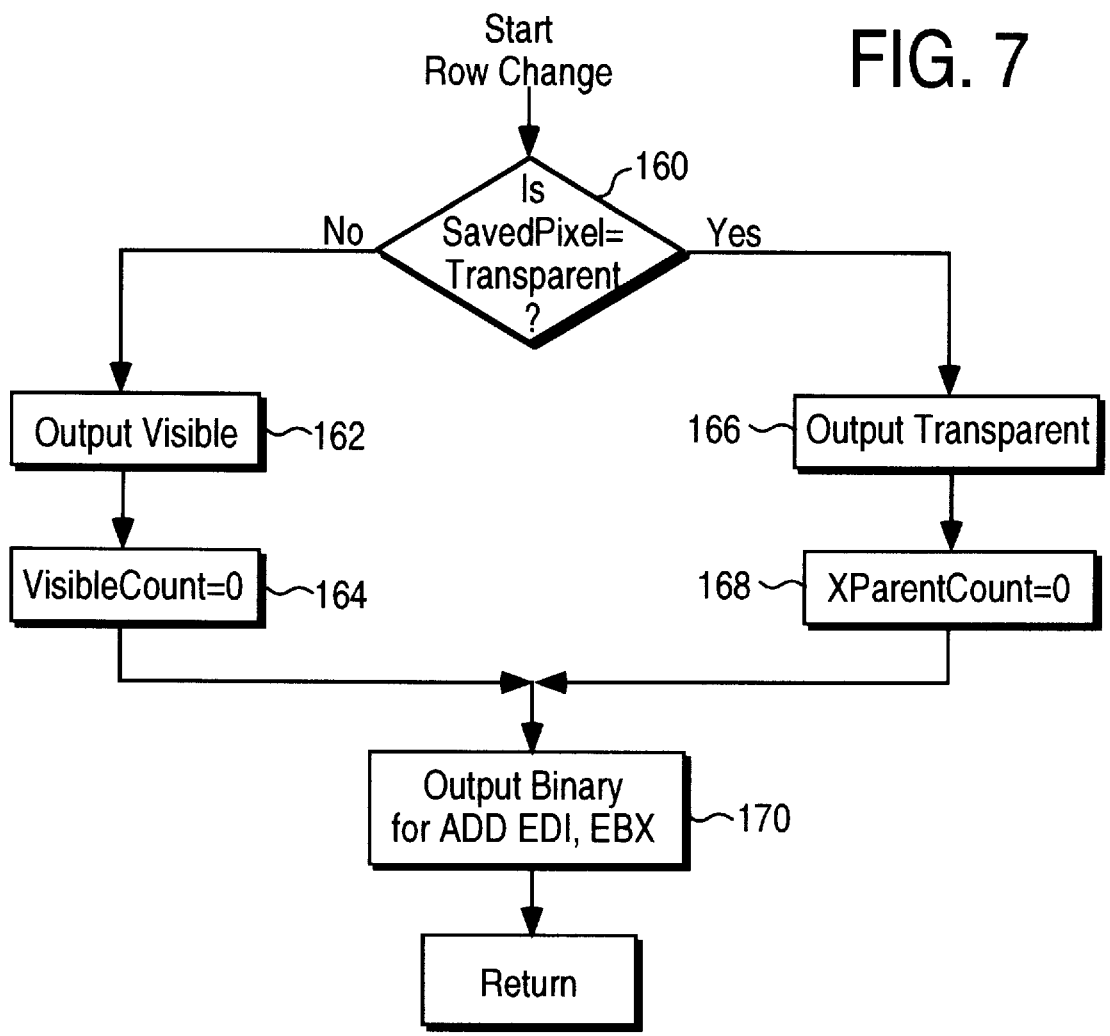

A mid-level flowchart of the RowChange subroutine is shown in FIG. 7. First, the RowChange subroutine determines in step 160 whether savedpixel is transparent. If savedpixel is not transparent, then the pixels at the end of the row were opaque, so a copy command is added to queue 50 in step 162 by calling the OutputVisible subroutine, and visiblecount is reset to zero in step 164. On the other hand, if savedpixel is transparent, then the pixels at the end of the row were transparent, so a skip command is added to queue 50 in step 166 by calling the OutputVisible subroutine, and visiblecount is reset to zero in step 168. In either case, in step 170 the RowChange subroutine outputs the an end-of-row skip instruction to queue 50, and then returns to the calling program. This end of row skip instruction may be the binary code for "ADD EDI, EBX".

Figure 8:
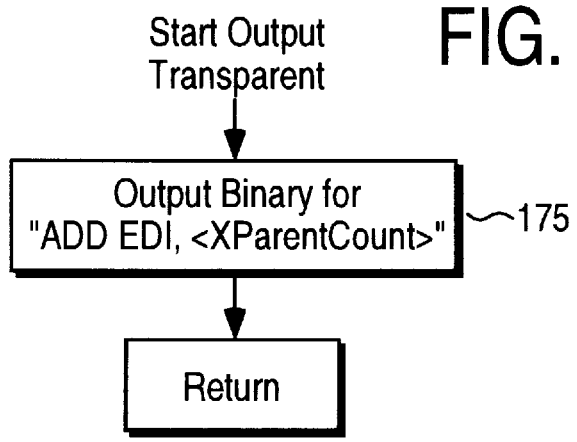

A low level flowchart of the OutputTransparent subroutine is shown in FIG. 8. The subroutine consists of a single step 175 in which the skip instruction "ADD EDI, <xparentcount>" is added to the queue 50. For example, if xparentcount equals six, then "ADD EDI, 6"will be sent to queue 50.

Figure 9:
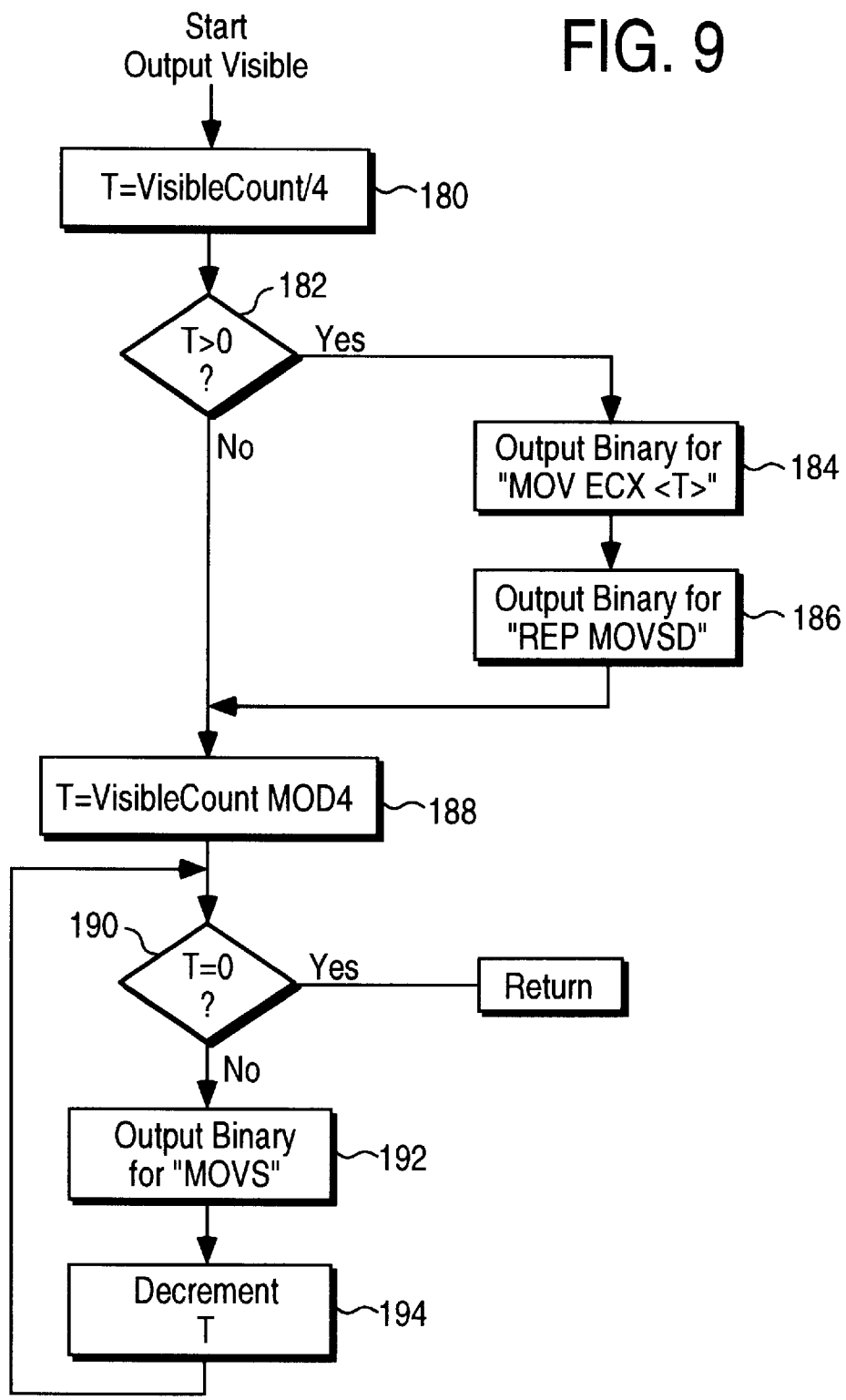

A low level flowchart of the OutputVisible subroutine is shown in FIG. 9. The subroutine begins in step 180 by setting the variable T equal to one-quarter of visiblecount, rounded down. If T is greater than zero, as determined by step 182, then the copy instructions "MOV ECX, <AT>; REP MOVSD" are added to queue 50 in steps 184 and 186. If T equals zero, then steps 184 and 186 are bypassed.

In step 188 the variable T is set equal to the remainder from visiblecount divided by four. The OutputVisible subroutine determines, in step 190, whether T is zero. If T is greater than zero, a copy instruction "MOVS" is output in step 192 and T is decremented in step 194. Steps 190-194 are repeated until T equals zero, and the subroutine ends.

Figure 10:
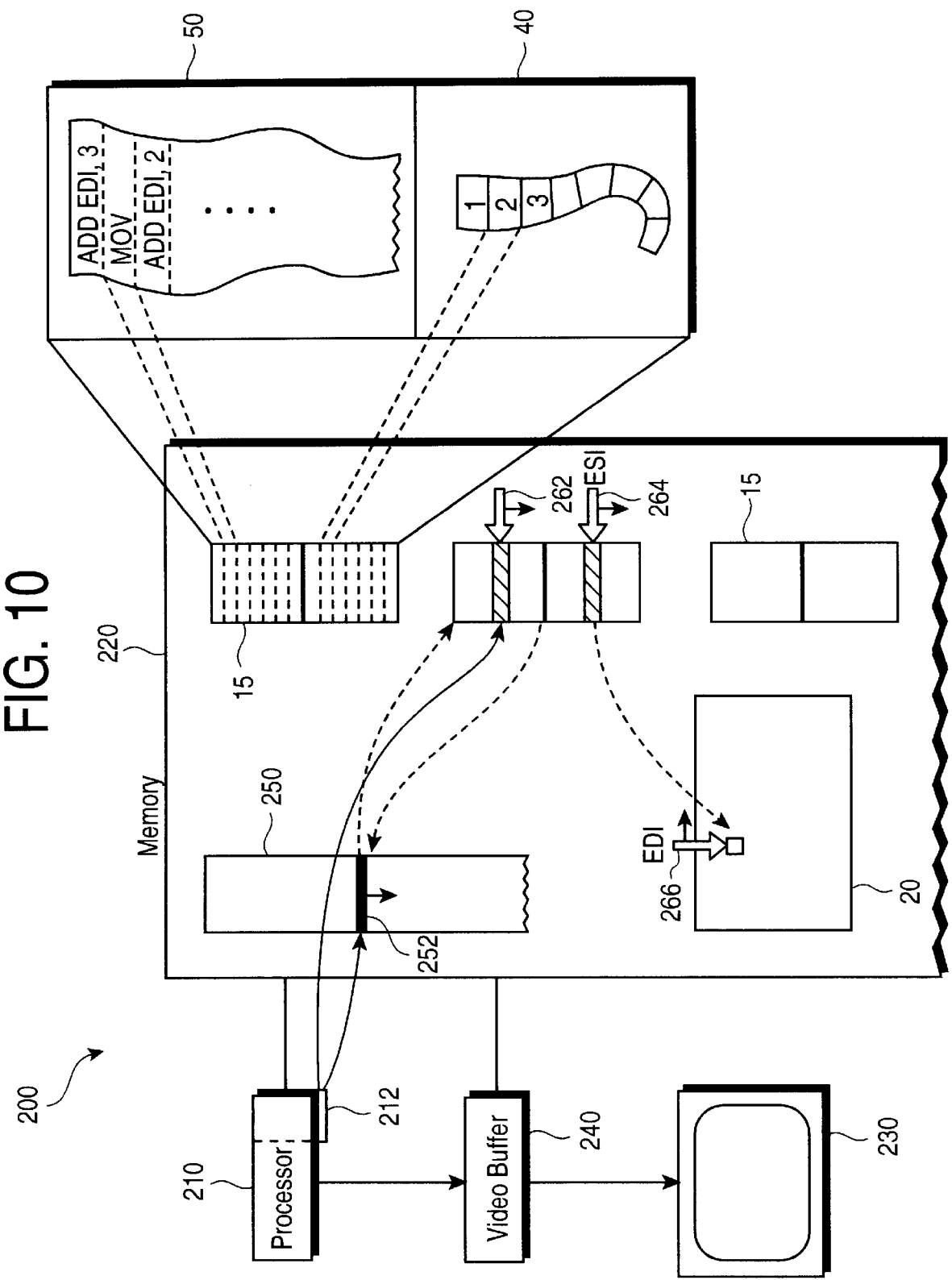
FIG. 10 and 11 are schematic illustrations of a computer and a process for converting an instruction queue and data into a displayed sprite.

A general purpose computer 200 to display sprites 15 is shown by FIG. 10. Computer 200 includes a central processing unit 210 to execute instructions, a memory 220 to hold data, a screen 230, and a video buffer 240 to control screen 230. Because Video buffer 240 may be addressed by processor 210, it is shown sharing memory 220.

Memory 220 stores a multimedia presentation or game program 250, which will show moving images on screen 230. Memory 220 also holds sprites 15, each including data 40 and instructions 50, and background 20.

The invention makes use of three pointers, variables which store a memory location, and thus "point"to a spot in memory. Instruction pointer 262, which may be stored in a register 212 in processor 210, indicates the location of the instruction for processor 210 to execute. Assuming that program 250 is machine executable code, in normal operation processor 210 loads and executes the instruction in program 250 indicated by pointer 262.

In the invention, some instruction 252 in program 240 causes pointer 262 to point to the top of instruction queue 50 in sprite 15. Processor 210 then executes individual instructions 52 from queue 50 as pointer 262 moves sequentially through queue 50.

The invention also includes a source pointer (ESI) 264 and a destination pointer (EDI) 266. Source pointer 266 points to a pixel in string 40, while destination pointer 264 points to a pixel in background 10. When processor 210 executes a copy instruction from queue 50, the data at the source pointer (ESI) 264 is moved to replace the data at the destination pointer (EDI) 266, and then both the source and destination pointers are incremented to move, to the next byte. When processor 210 executes a skip instruction from queue 50, only the destination pointer (EDI) 266 is incremented, and no data is moved.

Figure 11:
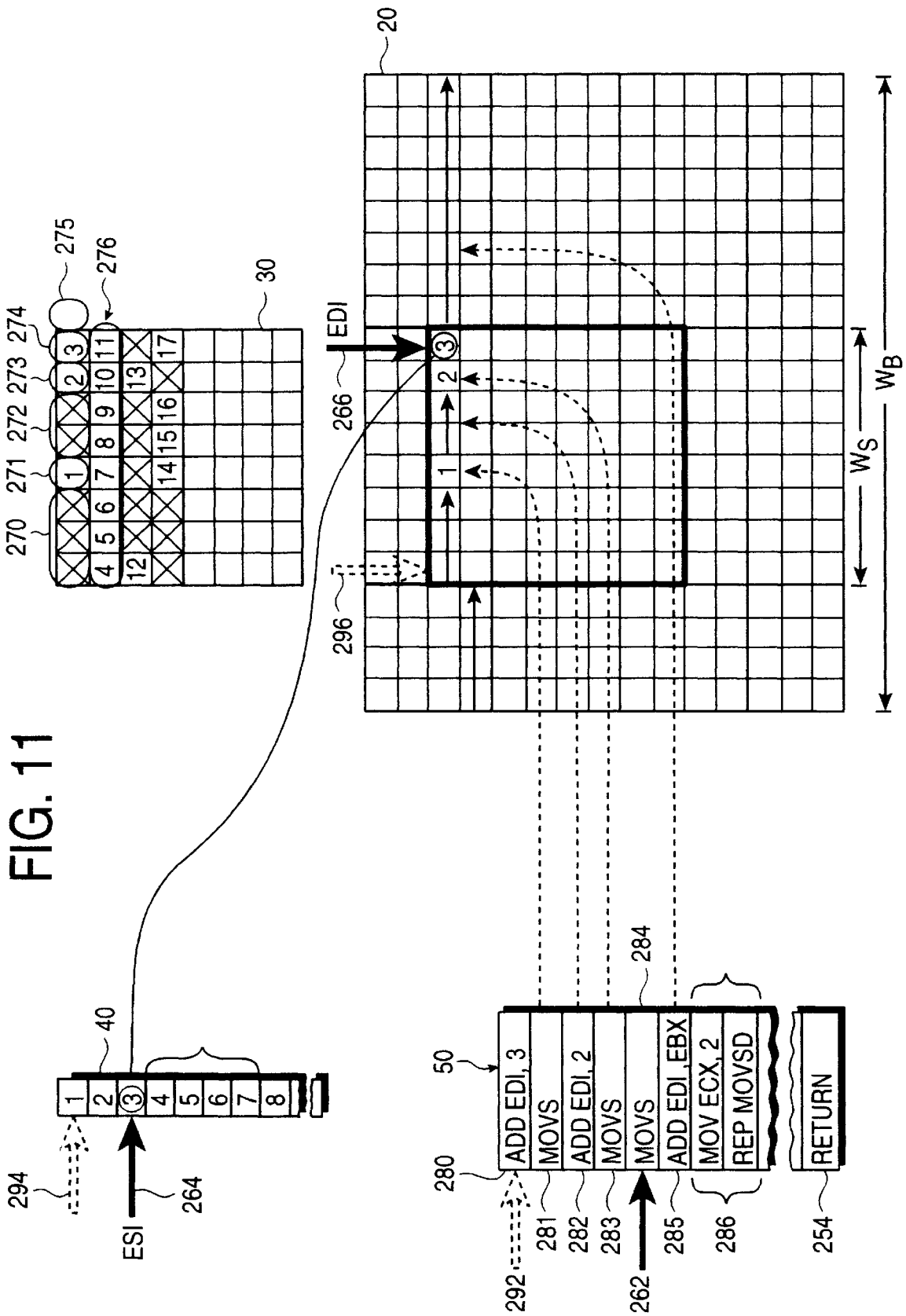

In FIG. 11, pixelmap 30 has been converted into string 40 and instruction queue 50. The instruction queue 50 contains two basic types of instructions: copy and skip. Transparent pixels are mapped into skip instructions, and opaque pixels are mapped to copy instructions. The copy instructions replace pixels in background 10 with opaque pixels from sprite 15, and the skip instructions skip pixels in background 10 where transparent pixels would be located in sprite 15.

Two types of copy instructions may be included in queue 50. The "MOVS" instruction moves one byte from a memory location defined by ESI pointer 264 to a memory location defined by EDI pointer 266, and then increments both EDI and ESI. For example, opaque pixel 271 may be mapped to instruction "MOVS" 281, while opaque pixels 273 and 274 are mapped to similar instructions 283 and 284.

The "MOVSD" is similar to the "MOVS" instruction, but it moves a word (four bytes) at a time rather than a byte at a time. The pair of instructions "MOVE ECX, <T>; REP MOVSD" causes the computer repeat the "MOVSD" instruction T times. For example, row 276 of eight opaque pixels may be mapped to the instructions "MOVE ECX, 2; REP MOVSD" 286.

The skip instruction "ADD EDI, <xparentcount>" increments EDI pointer 266 by the amount xparentcount, but does not move any data or adjust ESI pointer 264. For example, the three adjacent transparent pixels 270 may be mapped to the instruction "ADD EDI, 3" 280, while the two adjacent transparent pixels 272 are mapped to the instruction "ADD EDI, 2".

The skip instruction "ADD EDI, EBX" increments EDI pointer 266 by the amount in EBX. Program 250 will set EBX equal to the difference between the width $W_S$ of pixelmap 30 and the width $W_D$ of background 20. This difference $W_S-W_D$ is equal to the number of pixels to carry EDI pointer 266 from the end of one row to the beginning of the next row. As an example, the end of the row 275 may be mapped to the instruction "ADD EDI, EBX".

To display sprite 30, the program 250 begins by setting ESI pointer 264 to the top 294 of string 40, EDI pointer 266 to the pixel 296 in background 20 where the upper right hand corner of sprite 15 will be located, and instruction pointer 262 to the top 292 of queue 50. Processor 210 then commences executing the instructions in queue 50.

Reviewing the instructions mapped from the first row of pixels in sprite 30, the first instruction increments the EDI pointer 266 by two pixels. The second instruction 281 replaces the pixel in background 20 at the current location of EDI pointer 266 with the pixel in string 40 at the ESI pointer 264, and then increments both the ESI and EDI pointers by one pixel. Instruction 283 increments the EDI pointer by two pixels. Instructions 273 and 274 each replace a pixel in background 20 with the pixel from the string 40, and then increment the pointers 264 and 266. Instruction 275 increments the EDI pointer 266 by $W_S-W_D$ pixels to the beginning of the next row.

Once every instruction in queue 50 has been executed, the entire sprite has been overlaid onto background 20. The opaque pixels in sprite 30 replace pixels in background 20, and transparent pixels in sprite 30 leave background 20 unchanged. The last instruction 254 in queue 50 is a return instruction, which causes pointer 262 to return to program 250.

Appendixes A and B set forth C++ code for an implementation of the invention. The implementation takes a regular 8-bit Windows destination-independent-bitmap (DIB) and creates one instruction list using native machine code and another instruction list for an interpreter. The machine code produces the faster display. The full embodiment would discard the unneeded transparent pixels, but implementation in Appendix A does not do so. Appendixes A and B also include a non-machine language version which is implemented more as an interpreter.

The routines of interest in Appendix A (starting at the bottom of the Appendix) include PrepareSprite(), which is called once to convert a transparent pixelmap into the string and instruction queue. EmitSkip() and EmitCopy() generate the machine codes for skip and copy instructions. RenderSprite() is called to overlay the sprite on the off-screen pixelmap. RunCode() is called by RenderSprite() to perform non-horizontally clipped blitting. Two versions are included in RunCode(), one for machine language and the other with an interpreter. RunCodeClipped() is called by RenderSprite() to perform horizontally clipped blitting. Although more complicated and slower than RunCode(), RunCodeClippedo is still extremely fast.

Other embodiments are within the scope of the claims. If the transparent pixels were not removed from the string 40, then an instruction could be used which adjusted both the EDI and ESI pointers without moving data. Only a portion of sprite 30 might be inside the border of background 20. In such a case, the instruction queue may be modified to handle clipping. Horizontal clipping is harder than vertical clipping. The generation of string 40 and instruction queue 50 may occur any time from when program 250 is written to when pixelmap 30 is loaded, but preferably it is an external one-time step performed before the application is distributed.

Adjacent skip instructions may be collapsed.

Where a row ends with transparent pixels, and the next row begins with transparent pixel, the "ADD EDI, <xparent-count>" instructions on either side of the "ADD EDI, EBX" instruction may be combined. For example, in FIG. 2, the four transparent pixels after the opaque pixel marked with a "13" would have produced the three instructions "ADD EDI, 1; ADD EDI, EBX; ADD EDI, 3". However, the three instructions have been collapsed to two instructions "ADD EDI, 4; ADD EDI, EBX".

The mnemonic and binary code for machine-executable instructions have been described for an Intel 80386 CPU. The specific instructions, and the order in which those instructions are executed, may be changed for different processors, such as the Motorola CPU. In addition, a variety of different flowcharts for the creation and execution of the instruction queue 50 are possible.

Figure 12:
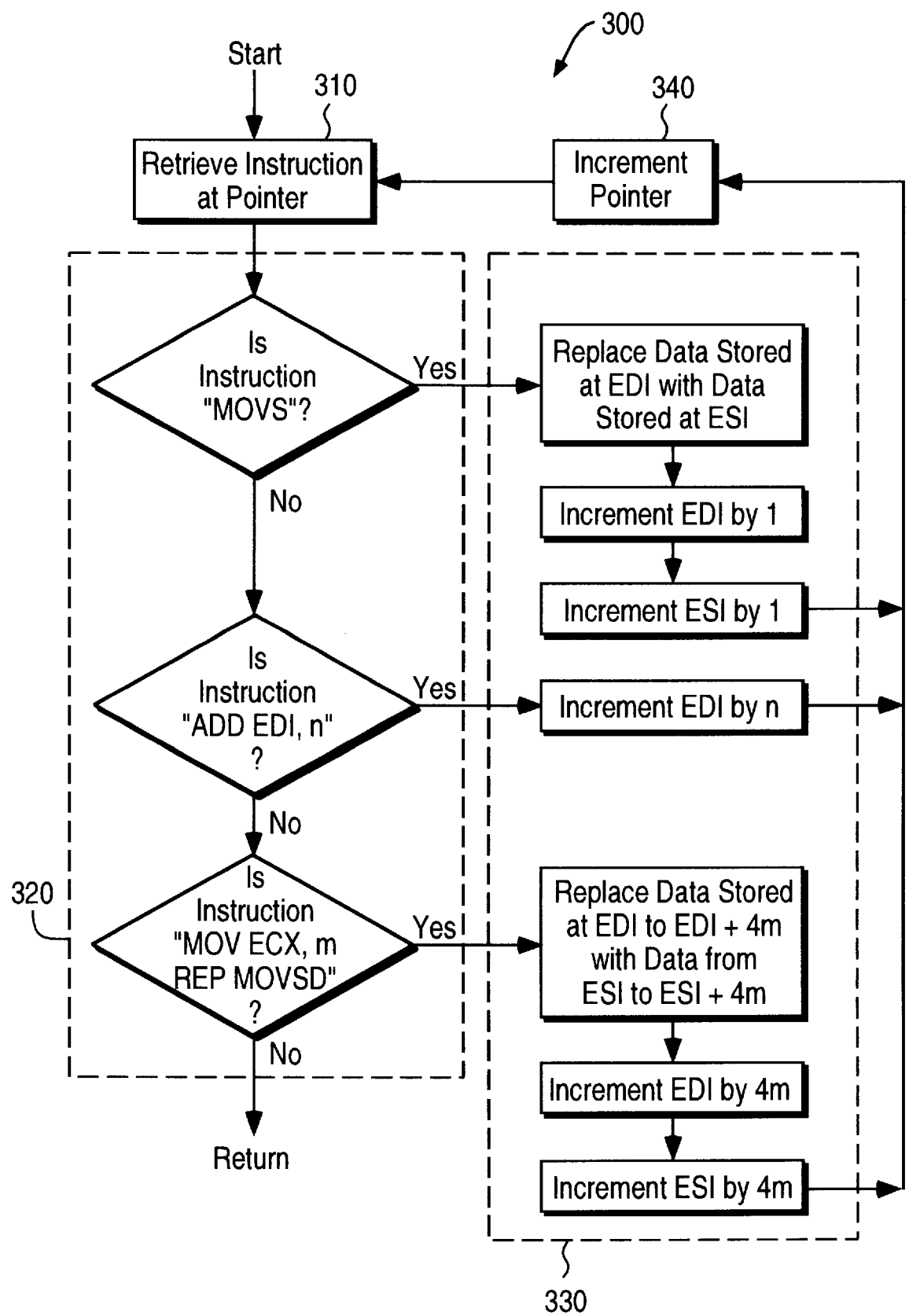
FIG. 12 is a block flowchart of an interpreter program.

As shown in flowchart form by FIG. 12, instructions in queue 50 might not be executed directly by processor 210, but rather by interpreter 300 in program 250. Interpreter 300 begins in step 310 by retrieving a code from queue 50. Next, in steps 320, interpreter 300 compares the code with a known list of commands. In steps 330, interpreter 300 carries out the instructions appropriate for the command. Finally, in step 340, the pointer in incremented and the next instruction retrieved.

Assuming a 100×100 pixelmap with an average of two transparent and one visible run per row, with half the pixels visible, the traditional method uses about 55,000 instructions to look at pixels and 400 instructions to move among rows. Each instruction takes an average of two machine cycles (because of Jxxs and LOOP), for a total of about 111,000 machine cycles and over 15,000 cache-flushing JMPs or LOOPs. The code generated according to the invention uses an average of five or six instructions per row (550 instructions) at about four cycles per instruction (because MOVS is slow), for about 2,200 cycles. In addition, the code uses three cycles per group of four moved pixels (plus remainders) for about 5000 cycles. Thus, the generated code uses only about 7,200 machine cycles, with no JMPs or LOOPs.

What is claimed is:

1. A method of block transferring and displaying an image having transparent and non-transparent pixels from a memory, comprising the steps of:
   retrieving a machine executable instruction from an instruction queue in the memory, the instruction queue including a copy instruction and a skip instruction accompanied by a count number;
   when the retrieved instruction is a copy instruction, performing the following steps:
      obtaining a pixel value from a source pointer;
      transferring the obtained pixel value to a destination pointer;
      incrementing both the source pointer and the destination pointer; and
      returning to said step of retrieving;
   when the retrieved instruction is a skip instruction, performing the following steps:
      incrementing a destination pointer by a count established by the skip instruction count number; and
      returning to said step of retrieving.

2. The method of claim 1, wherein the retrieved copy instruction copies one byte of pixel data.

3. The method of claim 1, wherein the retrieved copy instruction copies one word of pixel data.

4. A data structure in a computer-readable medium to store an image of a succession of transparent and non-transparent pixels for block transfer to a destination, comprising:
   data representing the values of the non-transparent pixels;
   an instruction queue, including a copy instruction and a skip instruction accompanied by a count number, said instruction queue further comprising:
   a set of instructions performing the following steps when the retrieved instruction is a copy instruction:
      obtaining a pixel value from a source pointer;
      transferring the obtained pixel value to a destination pointer;
      incrementing both the source pointer and the destination pointer; and
      returning to said step of retrieving;
   a set of instructions performing the following steps when the retrieved instruction is a skin instruction:
      incrementing a destination pointer by a count established by the skip instruction count number; and
      returning to said step of retrieving.

5. The data structure of claim 4, wherein the copy instruction copies one byte of data.

6. The data structure of claim 4, wherein the copy instruction copies one word of data.

7. The data structure of claim 4, wherein the number of transparent pixels skipped by the skip instruction is the number of successive transparent pixels between non-transparent pixels in the image.

8. The data structure of claim 4, wherein the image stored is composed of a number of pixel rows across the image and wherein the number of transparent pixels skipped by the skip instruction is the number of successive transparent pixels at the end of a row in the image.

9. A computer system for block transfer and display of an image having transparent and non-transparent pixels, comprising:
   a processor for executing code; and
   a display for displaying the image;
   a memory storing a code executable by the processor and when executed, performing the steps of:
      retrieving a machine executable instruction from an instruction queue in the memory, the instruction including a copy instruction and a skip instruction accompanied by a count number;
      when the retrieved instruction is a copy instruction, performing the following steps:
         obtaining a pixel value from a source pointer;
         transferring the obtained pixel value to a destination pointer;
         incrementing both the source pointer and the destination pointer; and
         returning to said step of retrieving;
      when the retrieval instruction is a skip instruction, performing the following steps:
         incrementing a destination pointer by a count established by the skip instruction count number; and
         returning to said step of retrieving.

10. The computer system of claim 9, wherein the retrieved copy instruction copies one byte of pixel data.

11. The computer system of claim 9, wherein the retrieved copy instruction copies one word of pixel data.

* * * * *

UNITED STATES PATENT AND TRADEMARK OFFICE
CERTIFICATE OF CORRECTION

PATENT NO. : 5,880,739 Page 1 of 1
DATED : March 9, 1999
INVENTOR(S) : Roger S. Collins It is certified that error appears in the above-identified patent and that said Letters Patent is hereby corrected as shown below:

<u>Column 8,</u>
Line 19, delete "skin" and insert therefor -- skip --

Signed and Sealed this

Twenty-sixth Day of July, 2005

JON W. DUDAS
*Director of the United States Patent and Trademark Office*